United States Patent [19]

Ma

[11] Patent Number: 5,260,852
[45] Date of Patent: Nov. 9, 1993

[54] SLIDE BOX TYPE HARD DISK DRIVE WITH SYSTEM CONNECTING AND DISCONNECTING SWITCH ON A CIRCUIT BOARD

[76] Inventor: Hsi-Kuang Ma, 4F, No. 48, Sec. 2, Chung Cherng Road, Taipei, Taiwan

[21] Appl. No.: 921,116

[22] Filed: Jul. 29, 1992

[51] Int. Cl.$^5$ .......................... H05K 7/10; H01R 33/96
[52] U.S. Cl. ..................................... 361/685; 361/725;
361/736; 200/51.09
[58] Field of Search ............... 200/51 R, 51.09, 51.11;
364/708; 361/380, 390-392, 395, 399;
360/97.01

[56] References Cited

U.S. PATENT DOCUMENTS

| | | | |
|---|---|---|---|
| 4,091,246 | 5/1978 | Donofrio et al. ............ | 200/51.09 X |
| 4,593,162 | 6/1986 | Rochette .................... | 200/51.09 |
| 4,952,758 | 8/1990 | Dara et al. .................. | 200/51.11 X |

FOREIGN PATENT DOCUMENTS 3504560  8/1986  Fed. Rep. of Germany .... 200/51 R

Primary Examiner—Leo P. Picard
Assistant Examiner—Michael W. Phillips
Attorney, Agent, or Firm—Bacon & Thomas

[57] ABSTRACT

A hard disk drive includes a hard disk drive body fastened inside a box, a first connector on the hard disk drive body, a second connector on the box for connecting to the mainframe of a computer system, a Buffer PCB (printed circuit board) connected between the first connector and the second connector, and a micro switch connected to the Buffer PCB to automatically disconnect the first connector from the second connector as the hard disk drive is inserted into or detached from the mainframe of a computer system.

1 Claim, 3 Drawing Sheets

SLIDE BOX TYPE HARD DISK DRIVE WITH SYSTEM CONNECTING AND DISCONNECTING SWITCH ON A CIRCUIT BOARD

BACKGROUND OF THE INVENTION

The present invention relates to hard disk drives and relates more particularly to a slide box type hard disk drive which uses a control switch to automatically cut off the system power as it is inserted into the system or detached from the system.

Conventionally, a computer hard disk drive is generally comprised of a memory disk rotated by a motor through a revolving shaft, a read head for storing or fetching data, and a control panel and a connector for electrical installation (see FIG. 1). In recent years, slide box type hard disk drives are commonly accepted for the advantage of easy installation. A slide box type hard disk drive as illustrated in FIG. 2, is generally comprised of a hard disk drive body (21) fastened inside a box (25). The box (25) has a connector (24) connected to the connector (23) on the hard disk drive body (21) by a flexible cable (22). By means of the connector (24) on the box (25), the hard disk drive body (21) is connected to the mainframe of a computer system. While inserting a slide box type hard disk drives into the mainframe of a computer system or detaching it therefrom, the system power must be turned off so that the mainframe of the computer system is not damaged or caused to produce error signals.

SUMMARY OF THE INVENTION

The present invention eliminates the aforesaid problem. According to the preferred embodiment, the connector on the box and the connector on the hard disk drive is connected by a Buffer PC board, which is controlled by a control switch. The control switch automatically cuts off the Buffer PC board from the system power as the hard disk drive is inserted into the system or detached from the system.

DETAILED DESCRIPTION OF THE PREFERRED EMBODIMENT

Figure 1:
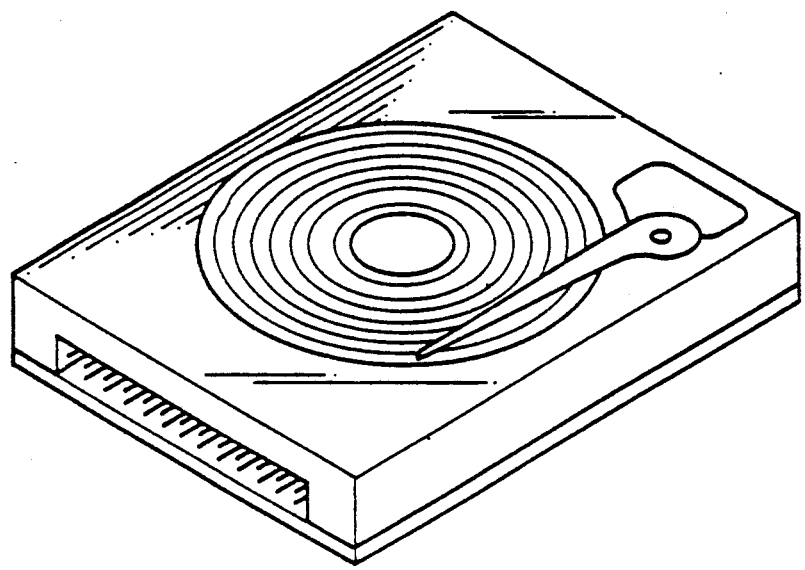
FIG. 1 is an elevational view of a regular hard disk drive according to the prior art.
Figure 2:
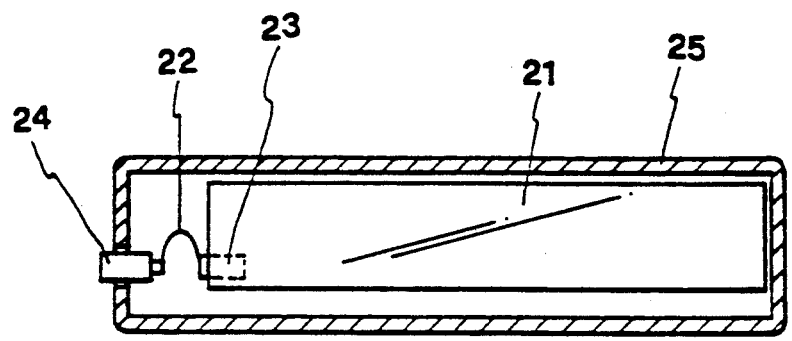
FIG. 2 is a cross section of a slide box type hard disk drive according to the prior art.
Figure 3:
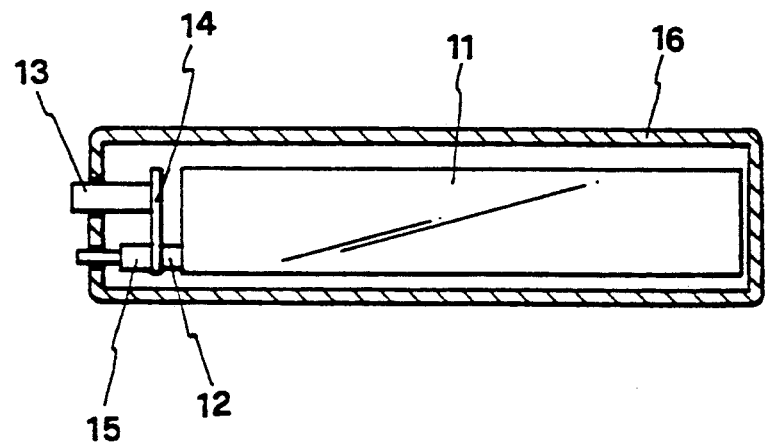
FIG. 3 is a cross section of a slide box type hard disk drive according to the present invention.

Referring to FIG. 3, a slide box type hard disk drive as constructed in accordance with the present invention is generally comprised of a hard disk drive body 11 fastened inside a box 16. The box 16 has a connector 13 for connecting to the mainframe of a computer system. The hard disk drive body 11 has a connector 12 connected to the connector 13 on the box 16 by a Buffer PCB (printed circuit board) 14 via a micro switch 15. The microswitch 15 is controlled to connect or disconnect the circuit between the connector 12 on the hard disk drive body 11 and the connector 13 on the box 16.

Figure 4:
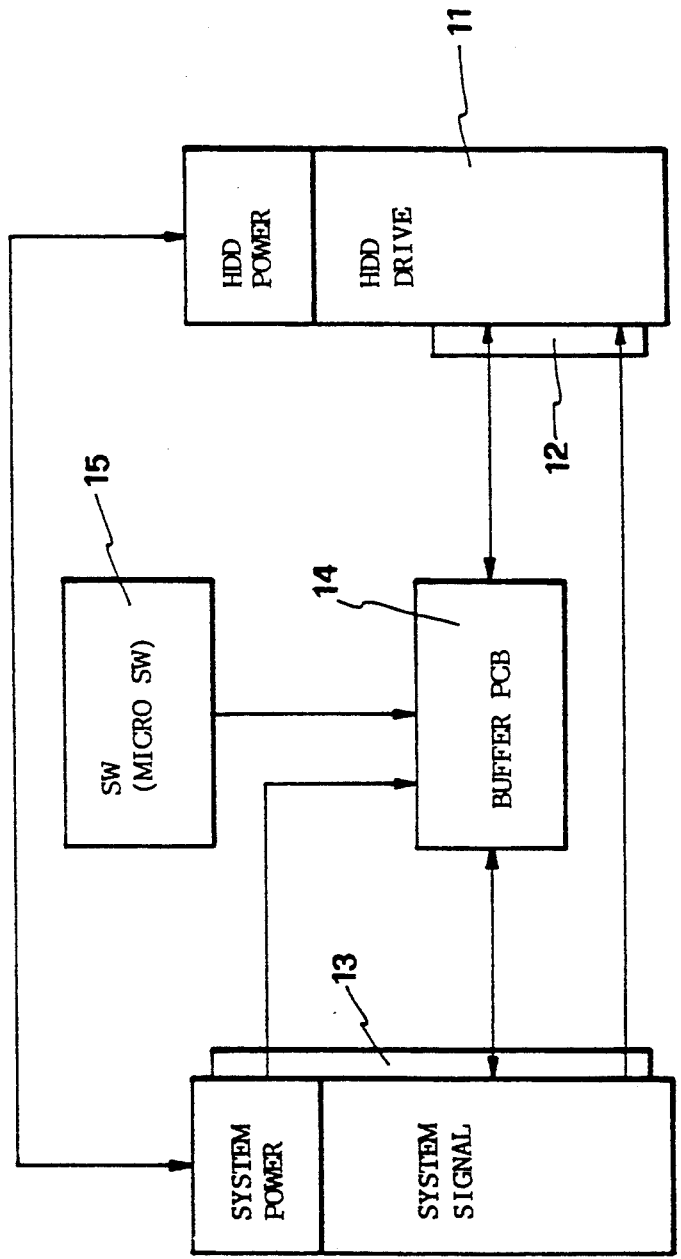
FIG. 4 is a control chart according to the present invention.

Referring to FIG. 4, the microswitch 15 is off before inserting the slide box type hard disk drive into a computer system. As the connectors 12 and 13 are connected, the microswitch 15 is automatically connected, and therefore the Buffer PCB 14 is electrically connected for data transmission between the connectors 12 and 13. When the slide box type hard disk drive is detached from the computer system, the microswitch 15 is automatically disconnected from the system power to stop signal transmission between the system and the hard disk drive. Therefore, inserting the hard disk drive into a computer system or detaching it therefrom does not interfere with the operation of the system.

What is claimed is:

1. A hard disk drive comprising a box having a connector for connecting the hard disk drive to a mainframe assembly of a computer system, a hard disk drive body fastened inside said box and having a connector connected to the connector on said box; a buffer circuit board connected between the connector on said box and the connector on said hard disk drive body; and means including a microswitch on said circuit board for automatically connecting and disconnecting the connector on said hard disk drive body from the connector on said box as the hard disk drive is, respectively, inserted into or detached from the mainframe assembly of the computer system.

* * * * *